(12) United States Patent
Peterman et al.

(10) Patent No.: US 7,780,029 B2
(45) Date of Patent: Aug. 24, 2010

(54) STACKABLE CONTAINER SYSTEMS

(76) Inventors: Carol Peterman, 7507 Second Ave., NE., Seattle, WA (US) 98115; David Peterman, 7507 Second Ave., NE., Seattle, WA (US) 98115

(*) Notice: Subject to any disclaimer, the term of this patent is extended or adjusted under 35 U.S.C. 154(b) by 362 days.

(21) Appl. No.: 11/867,522

(22) Filed: Oct. 4, 2007

(65) Prior Publication Data

US 2008/0083639 A1    Apr. 10, 2008

Related U.S. Application Data

(60) Provisional application No. 60/828,101, filed on Oct. 4, 2006, provisional application No. 60/865,799, filed on Nov. 14, 2006.

(51) Int. Cl.
*B65D 51/18* (2006.01)
*B65D 21/02* (2006.01)
*B65D 85/00* (2006.01)

(52) U.S. Cl. .................... 220/254.1; 206/508

(58) Field of Classification Search ............ 220/4.27, 220/235, 256.1, 258.1, 259.1, 254.1, 253; 206/503, 508
See application file for complete search history.

(56) References Cited

U.S. PATENT DOCUMENTS

| | | | |
|---|---|---|---|
| 444,702 A | | 1/1891 | Hartley |
| 2,707,552 A | | 5/1955 | Matthiesen |
| 2,836,323 A | | 5/1958 | Robinson |
| 2,897,994 A | | 8/1959 | Foss |
| 2,940,589 A | | 6/1960 | Silverman |
| 3,067,896 A | | 12/1962 | Berg et al. |
| 3,369,691 A | | 2/1968 | Wei |
| 3,485,416 A | | 12/1969 | Fohrman |
| 4,336,891 A | * | 6/1982 | Smith .................... 215/276 |
| 4,429,786 A | | 2/1984 | Hucal |
| 4,474,303 A | * | 10/1984 | Maccise .................. 220/4.27 |
| 4,724,977 A | * | 2/1988 | Cleevely et al. ........ 220/258.2 |
| 5,535,908 A | | 7/1996 | Sheu |
| D377,757 S | | 2/1997 | Bertolini et al. |
| 5,914,116 A | | 6/1999 | Suares et al. |

* cited by examiner

*Primary Examiner*—Anthony Stashick
*Assistant Examiner*—Harry A Grosso
(74) *Attorney, Agent, or Firm*—Dylan O. Adams; Graybeal Jackson LLP

(57) ABSTRACT

Systems and methods for providing a stackable container are provided herein.

11 Claims, 8 Drawing Sheets

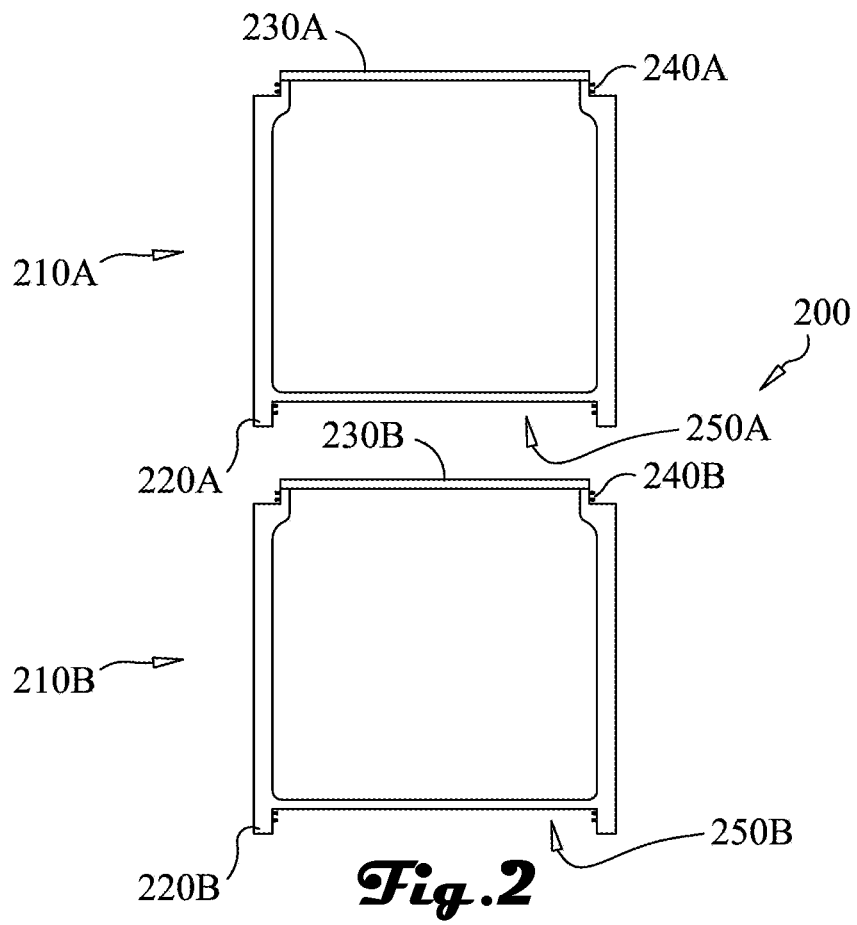
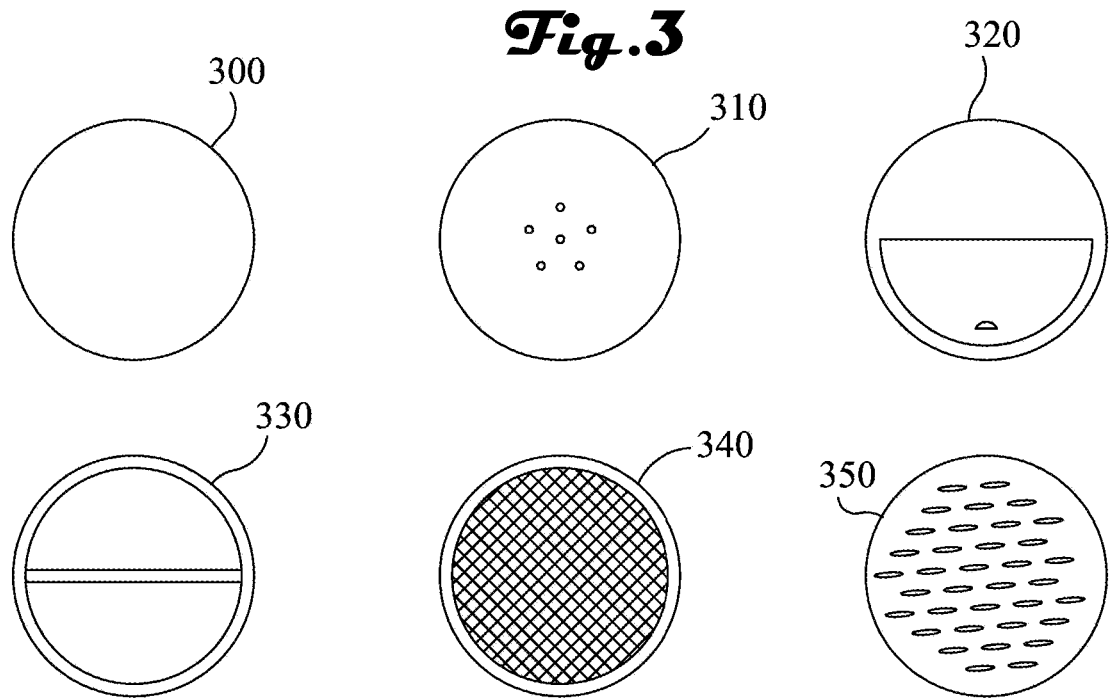

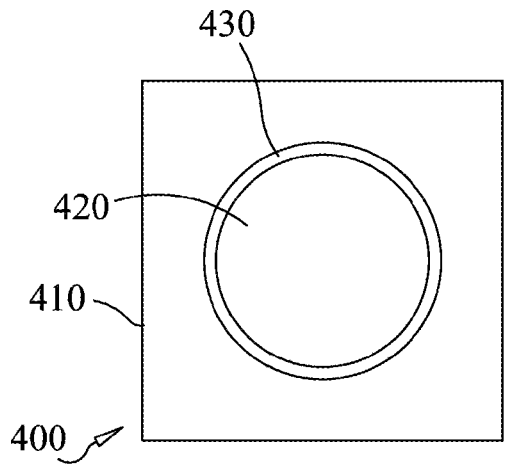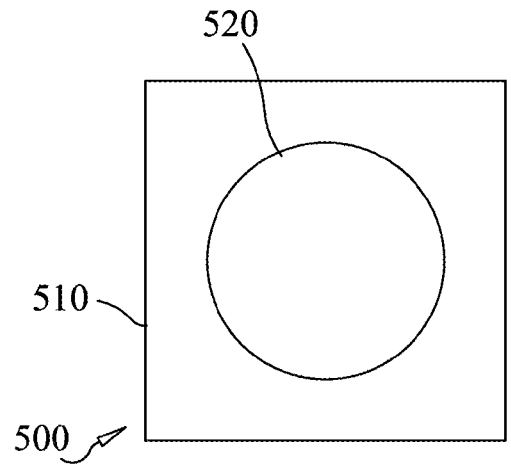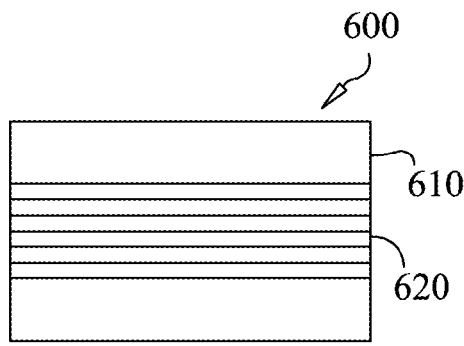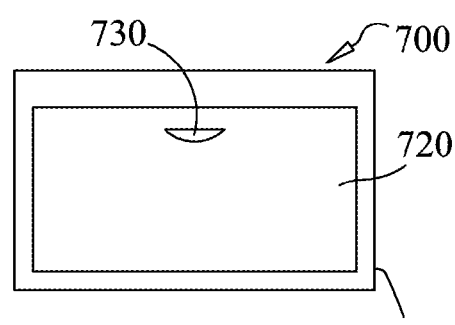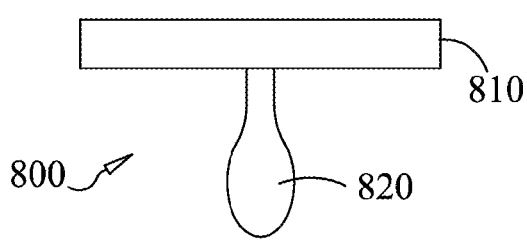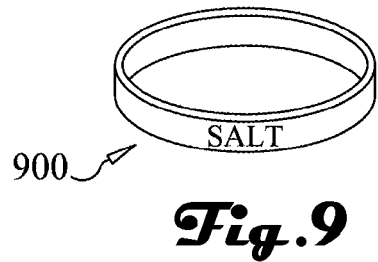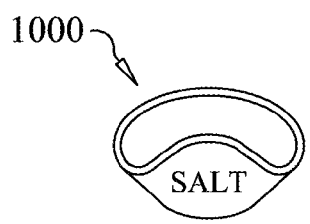

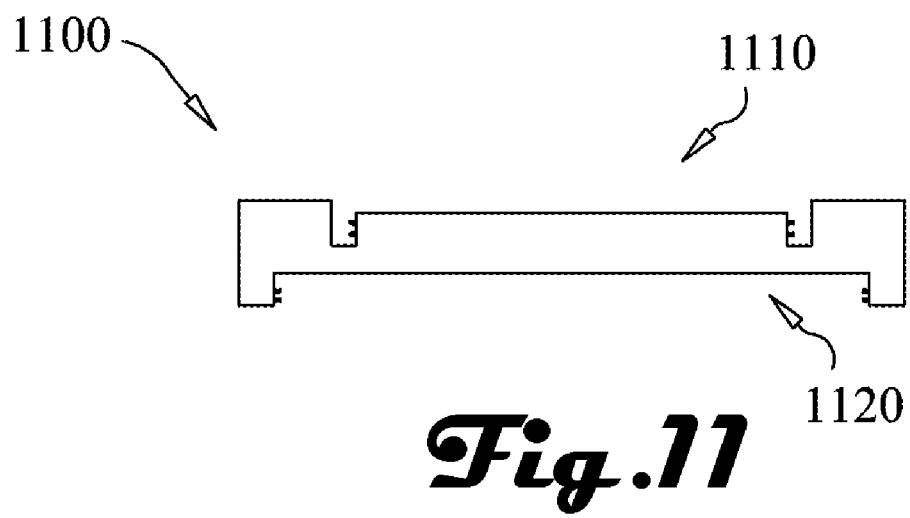
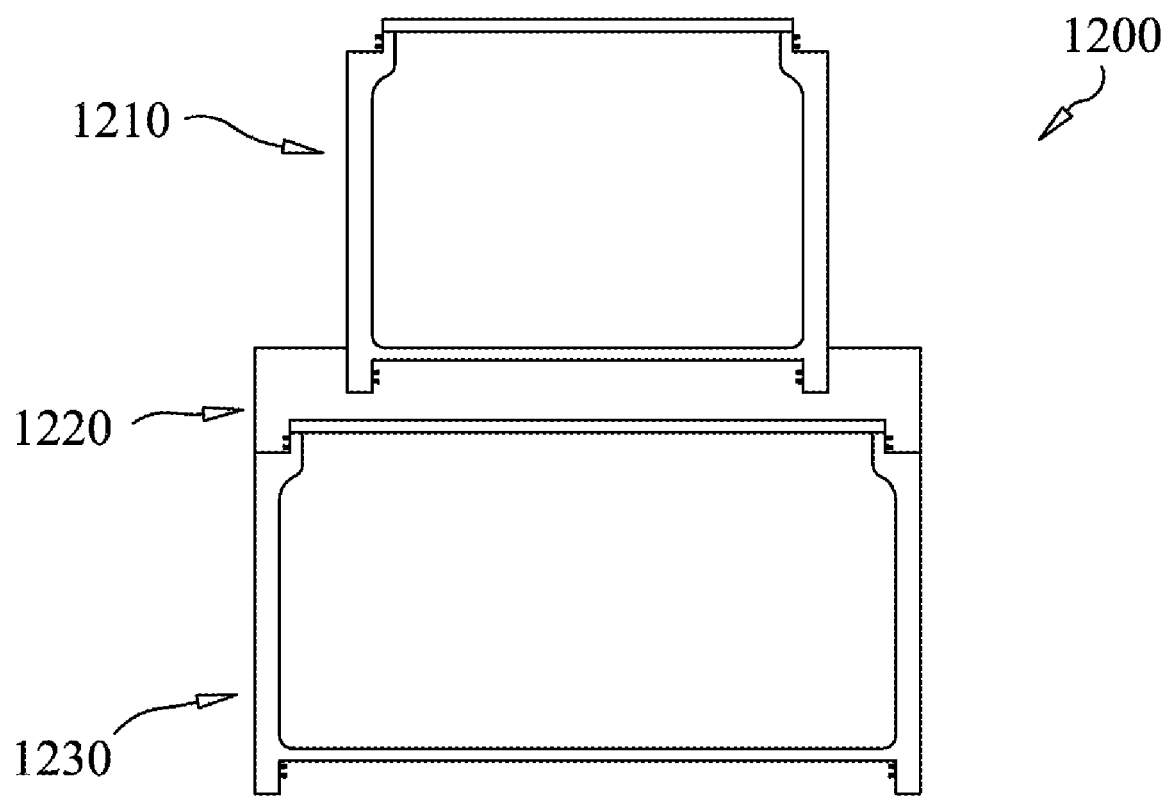

STACKABLE CONTAINER SYSTEMS

RELATED REFERENCES

This application claims priority to U.S. Provisional Application 60/828,101 filed Oct. 4, 2006 and U.S. Provisional Application 60/865,799 filed Nov. 14, 2006. The foregoing applications are hereby incorporated by reference in their entirety as if fully set forth herein.

FIELD

This invention relates generally to containers, and more specifically, to systems and methods for providing a stackable container.

BACKGROUND

Spices have been used to prepare food essentially since humans started cooking, and were some of the most valuable traded commodities in the ancient and medieval world. Additionally, the need to open new routes for spice trade catalyzed a widespread exploration of the continents. Today, spices are common and plentiful in developed nations, and the wide variety of spices creates a need for both professional and amateur cooks to store and organize their cooking ingredients.

A common kitchen has dozens of jars that contain spices, and these jars commonly reside on racks, turntables, or shelves that allow somewhat easy access to the commonly overwhelming morass of containers. Unfortunately, such systems are undesirable and provide many problems for cooks. First, the spices are commonly stored in container volumes that are too large, and the volumes stored cannot be completely used within a reasonable amount of time, if ever. Although cooks would ideally like to have large quantities of spices available so that they never run out of ingredients, they also face the issue of spice spoilage. Even spices that are stored in sealed glass jars can spoil due to oxidation, moisture, exposure to sunlight, bacteria, mold, or simple decomposition, and it is preferable to obtain fresh spices frequently. Next, when cooking certain recipes, dishes or varieties of food, cooks will commonly use a selected set of spices each time. Current spice organization systems do not allow a user to easily configure sets of spices to be used for specific cooking applications and the user must instead sort through all the stored spices each time the user cooks a meal, which is highly inefficient.

Stackable containers could be used to store and organize a plurality of spices; however, existing stackable containers are undesirable because they are not adequately configured to hold and dispense all types of spices. For example, many types of spices are powders or particulate matter that can cause a mess when used with conventional stackable containers because when conventional stacked containers are opened, the powdered or particulate spices can easily stick to capping containers or coupling systems and escape when the container is opened. Moreover, although current stackable containers provide some seal, they do not commonly provide an airtight seal, which is preferable when a user wants to keep the contents of the container fresh and unspoiled.

Additionally, each spice has specific dispensing and containing needs that are not served by conventional stackable containers. For example, salt and pepper are commonly stored in containers that have lids with different sized holes or a different number of holes—this is because salt is used more sparingly than pepper and needs to be dispensed at a slower rate than pepper. Additionally, many spices need to be leveled when used in conjunction with measuring spoons. In addition to not being configured to level a measuring spoon, many of both stackable and non-stackable containers known in the art are too small to be used with measuring spoons at all.

BRIEF DESCRIPTION OF THE DRAWINGS

The present invention will be described by way of exemplary embodiments but not limitations, illustrated in the accompanying drawings in which like references denote similar elements, and in which:

FIG. 2 is a side elevational cross-sectional view of a first and second stackable container, in accordance with an embodiment of the invention;

FIG. 3 is a top elevational view of an assortment of container caps, in accordance with an embodiment.

FIG. 4 is a top elevational view of a container base, in accordance with an embodiment;

FIG. 5 is a bottom elevational view of a container crown, in accordance with an embodiment;

FIG. 6 is a side elevational view of a container base, in accordance with an embodiment;

FIG. 7 is a side elevational view of a container base, in accordance with another embodiment;

FIG. 8 is a top elevational view of a measuring spoon, in accordance with an embodiment;

FIG. 9 is a perspective view of a labeling band, in accordance with an embodiment;

FIG. 10 is a perspective view of a labeling band, in accordance with another embodiment;

FIG. 11 is a side elevational cross-sectional view of a container coupling unit, in accordance with an embodiment;

FIG. 12 is a side elevational cross-sectional view of a plurality of stackable containers and a container coupling unit, in accordance with an embodiment;

DESCRIPTION

Illustrative embodiments presented herein include, but are not limited to, systems and methods for providing a stackable container.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

Figure 1:
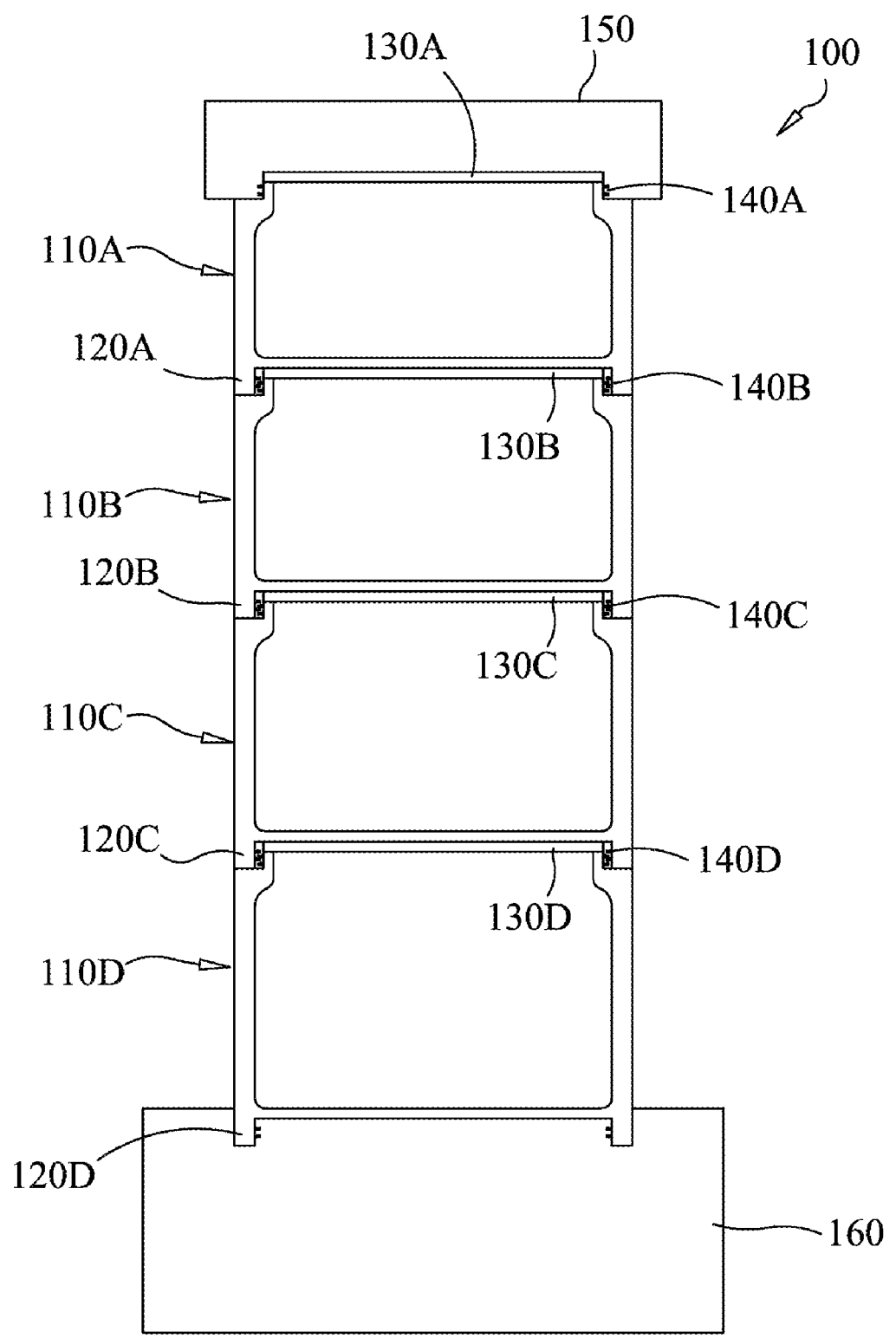
FIG. 1 is a side elevational cross-sectional view of a plurality of stackable containers, in accordance with an embodiment.

FIG. 1 is a side elevational cross-sectional view of a plurality of stackable containers 100, in accordance with an embodiment. The plurality of stackable containers 100 comprises a first, second, third and fourth container 110A, 110B, 110C, 110D, which are stacked and interconnected. Additionally, a container crown 150 is coupled to the top of the first container 110A, and a container base 160 is coupled to the bottom of the fourth container 110D.

The first container 110A comprises a first container rim 120A, a first container cap 130A, and a first container neck flange 140A. The second container 110B comprises a second container rim 120B, a second container cap 130B, and a second container neck flange 140B. The third container 110C comprises a third container rim 120C, a third container cap 130C, and a third container neck flange 140C. The fourth container 110D comprises a fourth container rim 120D, a fourth container cap 130D, and a fourth container neck flange 140D.

FIG. 1 depicts the first, second, third and fourth container 110A, 110B, 110C, 110D, which are coupled together. The first container 110A is coupled to the second container 110B by the coupling of the first container rim 120A to the second container neck flange 140B; the second container 110B is coupled to the third container 110C by the coupling of the second container rim 120B to the third container neck flange 140C; and the third container 110C is coupled to the fourth container 110D by the coupling of the third container rim 120C to the fourth container neck flange 140D. Additionally, the container crown 150 is coupled to the first container 110A by the coupling of the container crown 150 to the first container neck flange 140A and the fourth container 110D is coupled to the container base 160 by the coupling of the fourth container rim 120D to the container base 160.

In one embodiment, there can be one or more container, and the one or more container can be of any size, shape, form, configuration, texture, or the like. In a further embodiment, there can be one or more container of equal size. In another embodiment, there can be one or more container that is different in size compared to one or more other container. In one embodiment, there can be a plurality of containers, which can be stacked or coupled to each other in any order or configuration. For example, in the embodiment depicted in FIG. 1 a user can couple the first, second, third and fourth container 110A, 110B, 110C, 110D such that the containers are stacked and coupled such that the any of the first, second, third or fourth container 110A, 110B, 110C, 110D can be on the top, bottom, first from the top, or second from the top. In yet another embodiment there can be a cover that covers one or more container; for example, the container crown 150 can be absent and a cylindrical cover can be configured to cover one or more container.

FIG. 2 is a side elevational cross-sectional view of a first and second stackable container 210A, 210B, in accordance with an embodiment. The first container 210A comprises a first container rim 220A, a first container cap 230A, a first container neck flange 240A and a first container coupling orifice 250A, which is defined by the first container rim 220A. The second container 210B comprises a second container rim 220B, a second container cap 230B, a second container neck flange 240B, and a second container coupling orifice 250B, which is defined by the second container rim 220B. The first and second container neck flange 240A, 240B, further comprise threads and the interior of the first and second container rim 220A, 220B further comprise threads. The first and second container 210A, 210B are exactly, roughly or approximately cylindrical and the first and second container cap 230A, 230B, the first and second container neck flange 240A, 240B, the first and second container rim 220A, 220B, and the first and second container coupling orifice are also exactly, roughly, or approximately cylindrical or circular.

The first container 210A is coupled to the second container 210B by coupling of the first container rim 220A to the second container neck flange 240B, which is achieved by first configuring the first container 210A such that the second container cap 230B and the second container neck flange 240B are within the first container coupling orifice 250A or contacting the threads on the interior of the first container rim 220A. Next, the first and/or second container 210A, 210B can be twisted, rotated, screwed or spun such that the threads on the interior of the first container rim 220A couple or interlock with the threads on the second container neck flange 240B, and thereby couple the first and second container 210A, 210B.

In one embodiment, the first and second container 210A, 210B can be coupled by any system or method known in the art, including, but not limited to, slot and pin, friction, an adhesive, Velcro®, interlocking flanges, tongue and groove, latches, hinges, or snap fit. In a still further embodiment, any type or configuration of threads can be used to couple the first and second container 210A, 210B. In another embodiment, there can be one or more container that can be coupled together, and the one or more container can be any size, shape, texture, configuration, or the like Additionally, in a further embodiment, one or more container can be made of one or more material, which can be any material, including, but not limited to, glass, plastic, ceramic, paper, wood, metal, textile, stone, or the like.

Additionally, the first and second container cap 230A, 230B are coupled to the first and second container 210A, 210B respectively, at the distal end of the first and second container neck flange 240A, 240B respectively, which defines an opening or orifice that provides access to the interior cavity of the respective container 210A, 210B. The first and second container cap 230A, 230B can be coupled to the first and second container 210A, 210B by any means known in the art, including but not limited to slot and pin, tongue and groove, friction, an adhesive, Velcro®, interlocking flanges, latches, hinges, snap fit, or the like. In one embodiment, one or both of the first and second container cap 230A, 230B can be permanently or semi-permanently coupled to the first and second container 210A, 210B respectively.

In one embodiment, the first and second container rim 220A, 220B define a the first and second container coupling orifice 250A, 250B, and the first and second container coupling orifice 250A, 250B are configured such that when a container, 210A, 210B is coupled to either the first and second container coupling orifice 250A, 250B, there is little or no space between the container cap 230A, 230B and the bottom of the container 210A, 210B. In a further embodiment, the bottom of a container 210A, 210B can be configured to or can provide a seal for any orifice, hole, gap, or matrix that may be present in or on a container cap 230A, 230B. In a further embodiment, there can be any material or system affixed or coupled to the bottom or top of the container 210A, 210B, such as a disk, ring, o-ring, or other gasket, seal, or the like, which can be configured to or can provide a seal for any orifice, hole, gap, matrix, or the like that may be present in or on a container cap 230A, 230B, or which can be configured to provide a seal in, on or around the threads of either the first or second container 210A, 210B.

FIG. 3 is a top elevational view of an assortment of container caps, in accordance with an embodiment, which includes a closure cap 300, a shaker cap 310, a door cap 320, a leveling cap 330, a wire shaker cap 340, and a grater cap 350, which can be coupled, attached, or affixed, to one or more container as described herein. The closure cap 300 can be coupled, attached, or affixed, to one or more container so as to seal the container.

The shaker cap 310 can be coupled, attached, or affixed, to one or more container and facilitate a limited quantity, volume or size of matter to escape from the container. For example, as depicted in FIG. 3, the shaker cap can define five holes or orifices that can allow particulate matter that is smaller than any of the five holes or orifices to escape the internal cavity of a container. In one embodiment there can be one or more orifice or hole that can be in any configuration, of any size, and of any shape.

The door cap 320 can be coupled, attached, or affixed, to one or more container and can facilitate a limited quantity, volume or size of matter to escape from the container or can allow a user to seal the container. The door cap 320 comprises a door or flap in the door cap 320, which can be opened or closed. A user can open the door or flap in the door cap 320 and use any tool, or not use a tool, to remove or insert matter into the container, or a user can close the door or flap to prevent matter from escaping the container. The door or flap can be any size or shape and can further comprise a hinge and knob for opening.

The leveling cap 330 can be coupled, attached, or affixed, to one or more container and facilitate a limited quantity, volume or size of matter to escape from the container or can facilitate the leveling of a scooping or measuring tool that is being used to extract matter from the container. The leveling cap 330 comprises a rim and a cross-bar member, which defines two orifices. To level a scoop, spoon, or measuring spoon, can be inserted into the container, scoop matter into the tool and scrape the top edge of the tool across the cross-bar member to level or remove excess matter from above the plane of the tool. In one embodiment, the cross-bar member can be any shape or size, and can be in any configuration such that leveling of a scoop, spoon or measuring spoon is possible. In a further embodiment, the cross bar member is a planar member that is positioned perpendicular to the plane of the rim of the leveling cap 330.

The wire shaker cap 340 can be coupled, attached, or affixed, to one or more container and facilitate a limited quantity, volume, or size of matter to escape from the container. The wire shaker cap 340 comprises a rim and a plurality of wires that define a matrix, and the matrix defines a plurality of orifices. In one embodiment, the matrix can be any size, shape, or configuration and the orifices defined by the matrix can be any size, shape or configuration.

The grater cap 350 can be coupled, attached, or affixed, to one or more container and facilitate the grating or shaving of matter, whereby it is captured in the one or more container. The grater cap 350 comprises a plurality of slits that are slightly raised above the plane of the cap. In one embodiment, the plurality of slits can be in any size, shape, or configuration. In a further embodiment, the grater cap 350 can comprise a Microplane® grater.

The assortment of container caps as depicted in FIG. 3 should not be construed to limit the number, type or configuration of container caps that are within the scope of the present invention. Container caps of this type are well known in the art, and many other variations, configurations, or species of caps can be used in the present invention. In one embodiment, a user can put the same container cap on one or more container, can put different container caps on one or more container, or can put no container cap on one or more container.

FIG. 4 is a top elevational view of a container base 400, in accordance with an embodiment. The container base 400 comprises a base body 410, a base coupling member 420, and a base groove 430, which his defined by the base coupling member 420 and the base body 410. The base coupling member 420 further comprises threads that extend into the base groove 430, which facilitate the coupling of a container to the container base 400. A user can insert the container rim of a container (Not show in FIG. 4) into the base groove 430, and then twist, turn, spin or rotate the container and/or the container base 400 such that the threads on the base coupling member 420 couple with the threads on the container rim and thereby couple the base coupling member 420 and the container. In one embodiment, the container base 400 can be any size, shape, or configuration.

FIG. 5 is a bottom elevational view of a container crown 500, in accordance with an embodiment, which comprises a crown body 510 and a crown coupling orifice 520, which is defined by the crown body 510. The crown body 510 further comprises threads that extend into the crown coupling orifice 520, which facilitate the cap crown 500 being coupled to a container. A user can insert the container cap and container neck flange of a container (Not show in FIG. 4) into the crown coupling orifice 520, and then twist, turn, spin or rotate the container and/or the container crown 500 such that the threads on the crown body 510 couple with the threads on the container rim and thereby couple the container crown 500 and the container. In one embodiment, the container crown 500 can be any size, shape, or configuration.

FIG. 6 is a side elevational view of a container base 600, in accordance with an embodiment, which comprises a base body 610 and a plurality of tools 620. The plurality of tools 620 are a plurality of tools with a rectangular handle, that can be slid, inserted or stacked within the base body 610. In one embodiment, the plurality of tools can be a plurality of measuring cups or measuring spoons. In a still further embodiment, the plurality of tools can be tools, including, but not limited to, a fork, spoon, knife, grater, ruler, screwdriver, wrench, pliers, roller, mallet, hammer, cutting board, wisk, tongs, spatula, awl, peeler, sifter, pizza cutter, bottle opener, can opener, corkscrew, or the like. In a yet further embodiment any type of tool can be configured to reside a container base 600.

FIG. 7 is a side elevational view of a container base 700, in accordance with another embodiment, which comprises a base body 710, a base container 720, and a base container handle 730. The base container 720 is a box that resides within the base body 710, which can contain any matter, or nothing, including, but not limited to container caps or tools. In one embodiment, the base container 710 can be a box, bag, or any type of container and can be any size, shape or configuration.

FIG. 8 is a top elevational view of a measuring spoon 800, in accordance with an embodiment, which comprises a handle 810 and a spoon member 820. The handle 810 is a planar rectangular member, to which the spoon member 820 is coupled at the approximate middle of the handle 810. The measuring spoon 800 can reside in the container base (Not shown in FIG. 8) or be removed from the container base for use. In one embodiment, there can be one or more measuring spoon 800 that can reside in the container base and be removed for use, which can be any measuring size, including, but not limited to 1/16 teaspoon, 1/8 teaspoon, 1/4 teaspoon, 1/2 teaspoon, 3/4 teaspoon, 1.0 teaspoon, 1.25 teaspoon, 1.5 teaspoon, 0.5 tablespoon, 1.0 tablespoon, 1.5 tablespoon, 2.0 tablespoon and 2.5 tablespoon. In one embodiment, the handle 810 and the spoon member can be any shape, size or configuration.

In a further embodiment, there can be one or more nested measuring spoon or scoop that is configured to reside or be stored within a container base. The one or more measuring spoon or scoop can be any size, shape or configuration. In another embodiment, there can be one or more nested or un-nested measuring spoon that are coupled together and configured to reside within or be stored within a container base. In a still further embodiment, the handle 810 and the spoon member 820 can be any shape, size or configuration. In one embodiment, one or more measuring spoon or scoop can further comprise one or more magnet.

FIG. 9 is a perspective view of a labeling band 900, in accordance with an embodiment and FIG. 10 is a perspective view of a further labeling band 1000, in accordance with another embodiment. The labeling band 900, 1000 is an elastic band that can be stretched over a container and thereby label the container. The labeling band 900, 1000 can be made of any material, including silicone, rubber, neoprene, nitrile, nylon, or the like. In one embodiment, the labeling band 900, 1000 has been imprinted with the name of one or more material that can be contained within a container. In a further embodiment, a user can imprint or write on a labeling band 900, 1000. In yet another embodiment, a container can comprise one or more dent, groove, slot, projection or other member in which one or more labeling band 900, 1000 can reside.

In one embodiment of the present invention, spices and other cooking ingredients can be stored within a plurality of stackable containers. For example, referring to FIGS. 1 and 3, a different spice can be stored in each of the first, second, third, and fourth container 110A, 110B, 110C, 110D, such as salt, pepper, cinnamon powder, and baking powder respectively. A user can choose and configure each container cap 130A, 130B, 130C, 130D to best suit the user's needs depending on the type of spice being contained within a given container 110A, 110B, 110C, 110D.

For example, because salt is used relatively sparingly and is commonly shaken out of a container when used, the user can choose or configure the first container cap 130A to be a shaker cap 310 with a limited number of small orifices. Additionally, because pepper is used in a greater proportion compared to salt, and is also commonly shaken out of a container, a user can choose and configure the second container cap 130B to be a shaker cap 310 that has more orifices or larger orifices than the first container cap 130A, which is on the first container 110A. Next, because cinnamon sticks must be grated to create cinnamon powder, a use can first choose a cap grater 350 and couple a grater cap 350 to the third container 110C, grate a cinnamon stick over the grater cap 350 and into the third container 110C, remove the grater cap 350, and then choose and configure a shaker cap to be the third container cap 130C. Finally, because baking soda is commonly used with measuring spoons, a user can choose and couple a leveling cap 330 onto the fourth container 110D. A user can then use a measuring spoon to scoop an amount of the baking powder out of the fourth container 110D and level the measuring spoon on the leveling cap 330 as the user draws the measuring spoon out of the fourth container 110D.

FIG. 11 is a side elevational cross-sectional view of a container coupling unit 1100, in accordance with an embodiment, which comprises a first unit container coupling orifice 1110 and a second unit container coupling orifice 1120. The container coupling unit 1100 is configurable to couple or join two stackable containers of different diameters. As depicted in FIG. 11, the base of a smaller stackable container can be coupled to the first unit container coupling orifice 1110 and the container neck flange of a larger stackable container can be coupled to the second unit container coupling orifice 1120.

In one embodiment a larger container can be coupled to first unit container coupling orifice 1110 and a smaller container can be coupled to the second unit container coupling orifice 1120. In a further embodiment, containers of equal size can be coupled to the first and second unit container coupling orifice 1110, 1120 and the first and second unit container coupling orifice 1110, 1120 can be the same diameter. In a still further embodiment, the container coupling unit 1100 can be configured to couple the base of a first and second container to the first and second unit container coupling orifice 1110, 1120. In yet another embodiment, the container coupling unit 1100 can be configured to couple the neck flange of a first and second container to the first and second unit container coupling orifice 1110, 1120. In one embodiment the container coupling unit 1100 can couple two or more stackable containers, one or more container or one or more article of manufacture in any orientation.

FIG. 12 is a side elevational cross-sectional view of a plurality of stackable containers and a coupling unit 1200, in accordance with an embodiment, which comprises a first and second container 1210, 1230 and a container coupling unit 1220. As depicted in FIG. 2, the base of the smaller first stackable container 1210 can be coupled to the first unit container coupling orifice of the coupling unit 1220 and the container neck flange of a larger second stackable container 1230 can be coupled to the second unit container coupling orifice of the coupling unit 1220, thereby coupling the first and second stackable container 1210, 1230

Figures 13, 14:
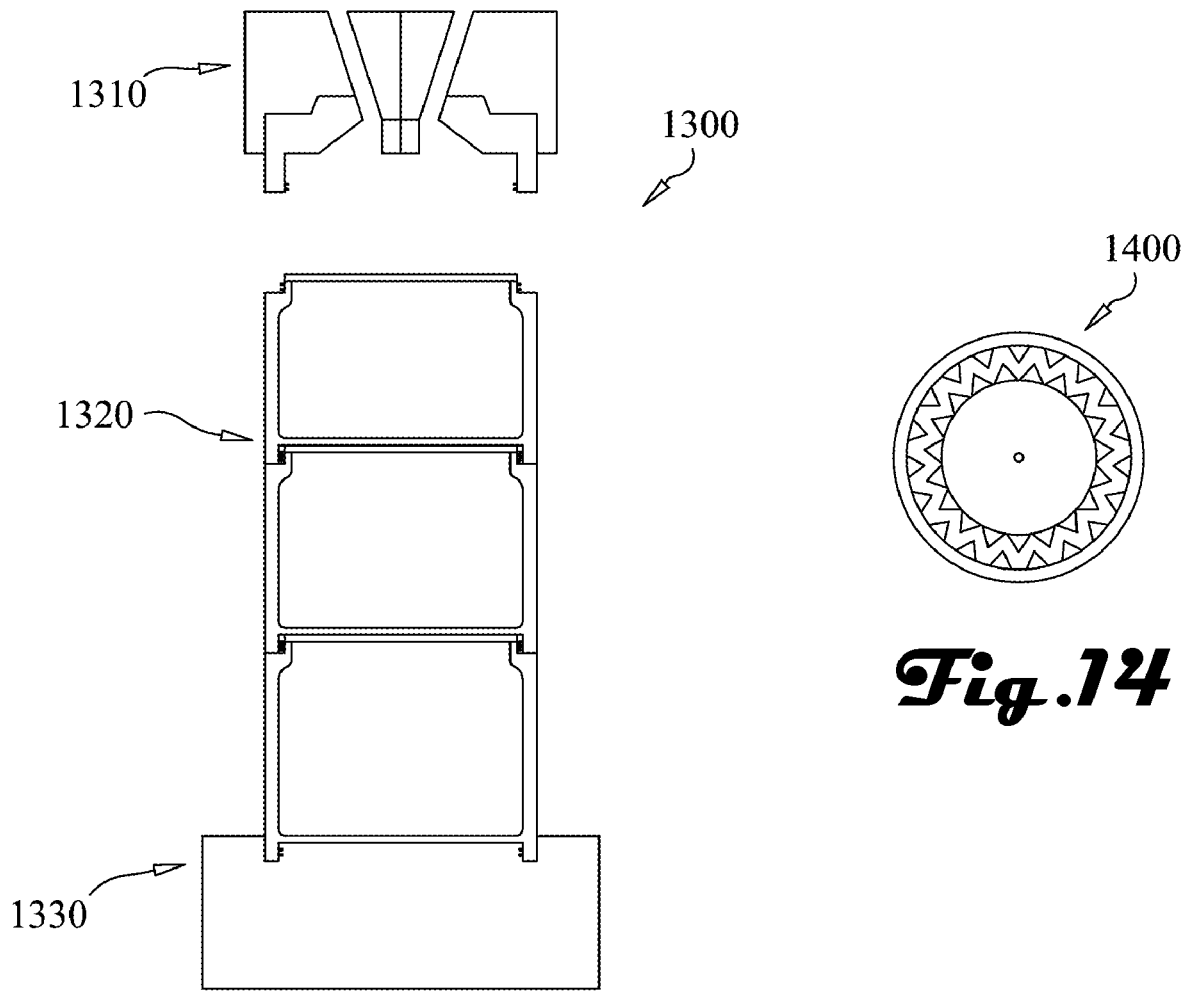
FIG. 13 is a side elevational cross-sectional view of a plurality of stackable containers and a grinder, in accordance with an embodiment.
FIG. 14 is top elevational view of a grinder in accordance with an embodiment.

FIG. 13 is a side elevational cross-sectional view of a plurality of stackable containers and a grinder 1300, in accordance with an embodiment, which comprises a grinder 1310, a plurality of stackable containers 1320, and a container base 1330. The grinder 1310 is configurable to be coupled to the top of a stackable container at the neck flange, which is achieved by a coupling of threads in the bottom of the grinder 1310 to the threads on a neck flange of a stackable container. The grinder can be coupled to a stackable container regardless of what type of cap is one the container or if there is no cap coupled to the container.

In one embodiment a user can affix or couple the grinder to a stackable container, configure the container such that the matter contained within the container can interact with the grinder 1310 and the matter can be ground. In a further embodiment the grinder is actuated by twisting an outer shaft that is rotatably connected to an inner shaft. In a still further embodiment there can be any type of grinder, in any configuration, that can be affixed to the neck flange of a container. In one embodiment the grinder 1310 is configured to be coupled to a rim of the container, where a cap would be coupled, or to any other area of a container. Grinders are well known in the art and one reasonably skilled in the art will immediately recognize the wide variety of grinders that could be configured to be coupled to a stackable container.

FIG. 14 is top view of a grinder 1400 in accordance with an embodiment, which depicts a grinder 1400 that comprises an outer shaft and an inner shaft, the internal portion of the outer shaft and the exterior portion of the inner shaft having teeth that are configurable to grind matter. The grinder depicted in FIG. 14 is simply illustrative of a type of grinder that can be used in one embodiment and one reasonably skilled in the art will immediately recognize the wide variety of grinders and configurations of grinders that will embody the spirit of the present invention.

Figure 15:
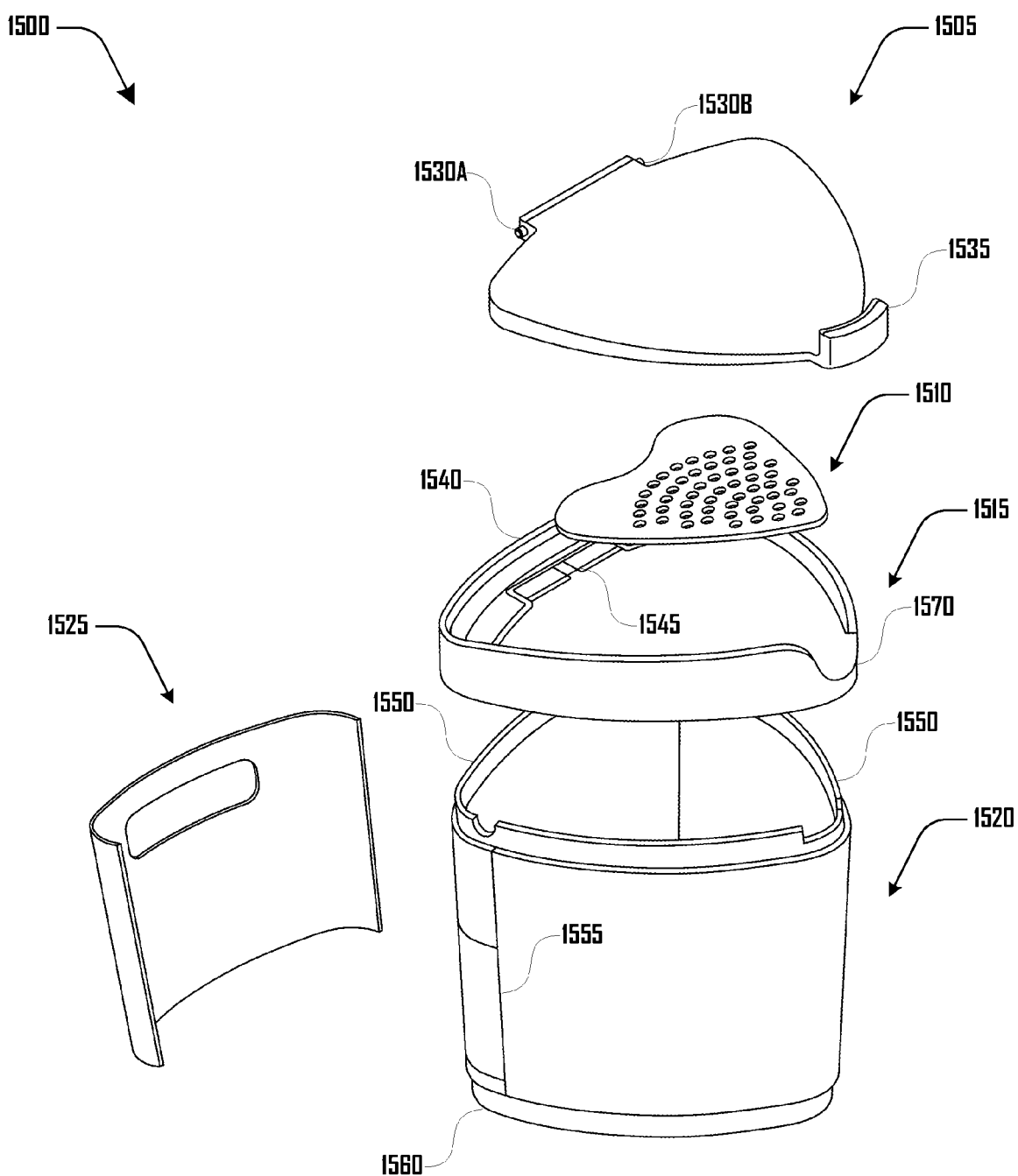
FIG. 15 is an exploded perspective view of a stackable container, in accordance with one embodiment.

FIG. 15 is an exploded perspective view of a stackable container 1500, in accordance with one embodiment. The stackable container 1500 comprises a lid 1505, a container cap 1510, a rim body 1515, a container body 1520, and a cover 1525. The lid 1505 comprises a first and second lid coupling member 1530A, 1530B, and a lid nodule 1535. The rim body 1515 comprises a rim 1540, a rim body coupling member 1545, and a rim basin 1570. The container body 1520 comprises a container body lip 1550, a cover coupling 1555, and a container body flange 1560.

The rim body 1515 is configurable to be coupled to the container body 1520 via the container body lip 1550. The rim body 1515 can comprise a slot or other structure to accept and hold the container body lip 1550 and thereby couple the rim body 1515 and the container body 1520. In one embodiment, any structure or system or combination thereof can be used to couple the rim body 1515 to the container body 1520, including slot and pin, friction connection, a glue, a fastener, or the like. In a further embodiment, the rim body 1515 can be permanently affixed or fused to the container body 1520, or the structures of the rim body 1515 can be embodied in a container body 1520.

Figure 19:
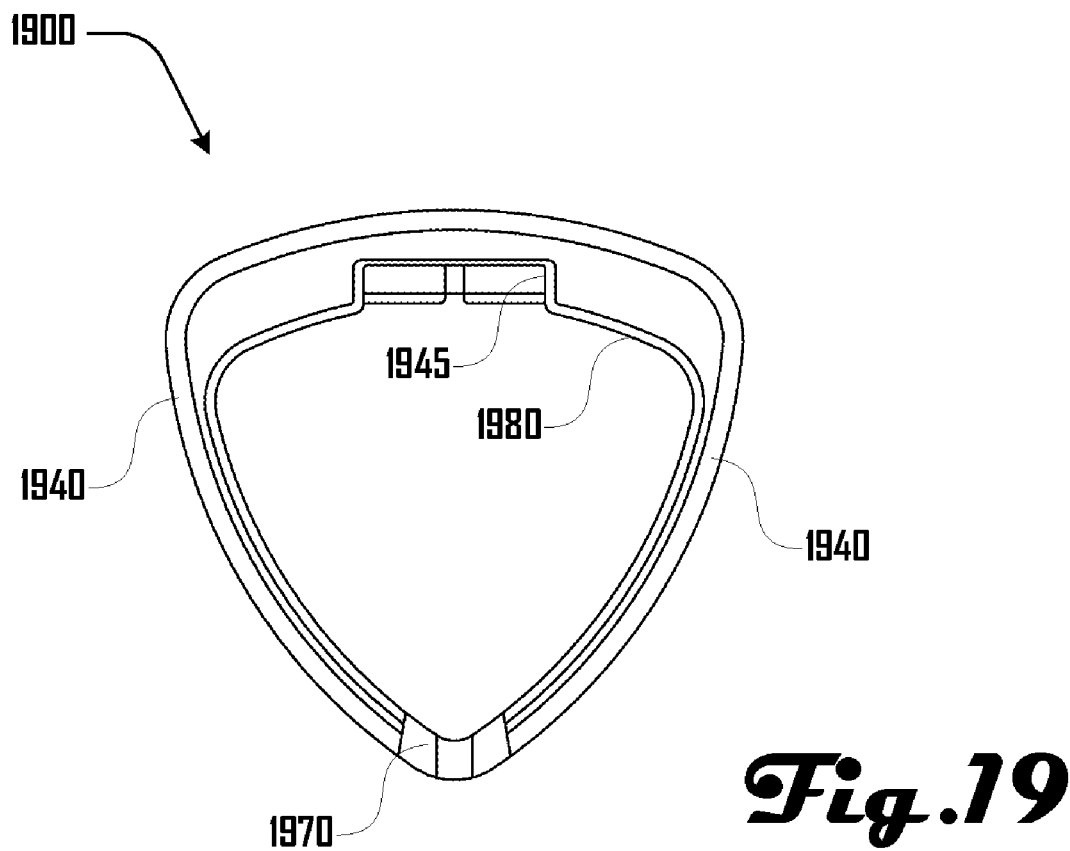
FIG. 19 is a top elevational view of a rim body in accordance with one embodiment.

The container cap 1510 can be coupled to the rim body 1515, and thereby provide a structure that can, limit, prevent or otherwise regulate the passage of matter through the orifice defined by the rim 1540. The container cap 1510 can be coupled to the rim body 1515 by any method or system known in the art, including a cap coupling rim (as depicted in FIG. 19). As described herein, the container cap 1510 can be in any shape and can comprise a wide variety of structures that can provide for a wide variety of functionalities. (see e.g., FIG. 3).

In one embodiment, matter can be contained in the container body 1520 of the stackable container 1500, and a user can extract a portion of the matter from the stackable container 1500. For example, where pepper is stored in the container, a user can open the lid 1505, and manipulate the stackable container 1500 such that the pepper falls through pores or holes in the cap 1510, which is coupled to the rim body 1515. In one embodiment, the rim basin 1570 can be used as a channel to direct the matter once it has passed through the cap 1510 or otherwise left the container body 1520. In another embodiment, the lid nodule 1535 can reside in the rim basin 1570 when the lid 1505 is in a closed position over the cap 1510 and/or the orifice defined by the rim 1540 of the rim body 1515.

The lid 1505 can be coupled to the rim body 1515 via the coupling of the rim body coupling member 1545 and the first and second lid coupling member 1530A, 1530B. The coupling of the rim body coupling member 1545 and the first and second lid coupling member 1530A, 1530B can create a hinge that allows the lid to open and close about the orifice of the rim body 1515, which is defined by the rim 1540. In one embodiment, the rim body coupling member 1545 can define one or more orifice that corresponds to and can couple with the first and second lid coupling member 1530A, 1530B. In one embodiment, the lid 1505 can be coupled to the rim body 1515 by any system or method known in the art. In a still further embodiment, the lid 1505 can provide a seal around the orifice of the rim body 1515, which is defined by the rim 1540.

The cover 1525 can be coupled to the container body 1520. In one embodiment, the there can be a first cover coupling 1555 and a second cover coupling (not shown) that correspond to the cover 1525 and facilitate the coupling of the cover 1525 to the container body 1520. For example the cover coupling 1555 can be a slot, rim, protrusion or other member that corresponds to the arms of the cover 1525 and facilitate the coupling of the cover 1525 to the container body 1520. In a still further embodiment, the cover 1525 can be any shape or size, and can be coupled to the container body 1520 via any system or method known in the art. In yet another embodiment, a sheet can be placed between the cover 1525 and the container body 1520 when the two are coupled, which can allow the sheet to be seen through the orifice defined by the cover 1525. In one embodiment, the sheet can be a piece of paper, plastic, wood, or the like, and a user can create one or more marking on the sheet that can be seen through the orifice defined by the cover 1525. For example, a user can write a description of the contents of the stackable container 1500.

Figure 16:
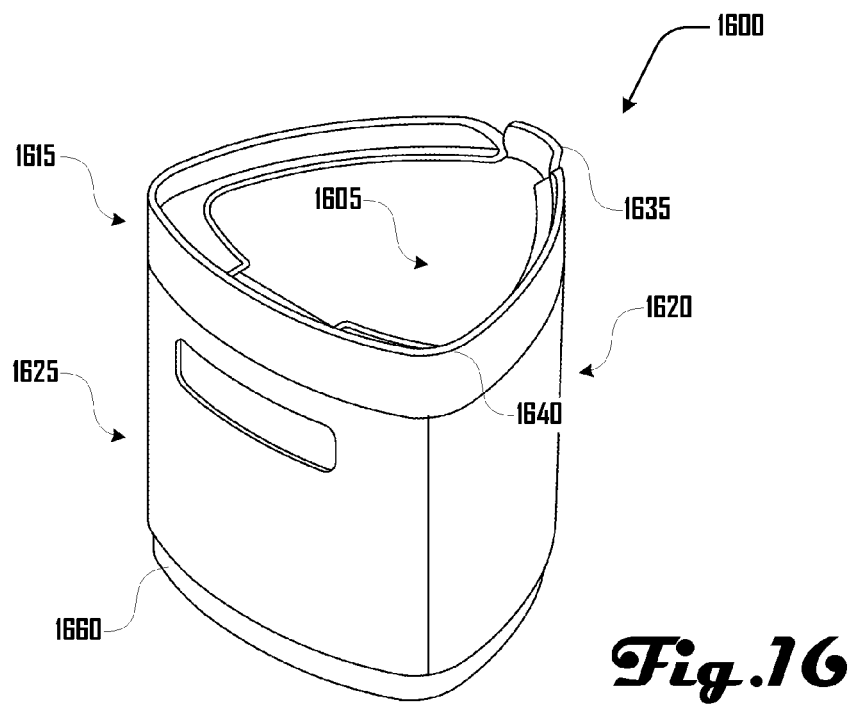
FIG. 16 is a perspective view of a stackable container, in accordance with another embodiment.

FIG. 16 is a perspective view of a stackable container 1600, in accordance with another embodiment. The stackable container 1600 comprises a rim body 1615, which comprises a rim 1640; a cover 1625; a lid 1605, which comprises a lid nodule 1635; and a container body 1620, which comprises a container body flange 1660. The rim body 1615 is coupled to a first end of the container body 1620, which is opposite to the container body flange 1660 of the container body 1620. The cover 1625 is coupled to the container body 1620 as described herein. The lid 1605 is coupled to the rim body 1615 as described herein and provides a seal over the orifice defined by the rim 1640 of rim body 1615. The lid 1605 is coupled to the rim body 1615 such that the lid 1605 can be opened and closed by rotation about a hinged coupling. The lid nodule 1635 resides in a rim basin defied by a depression in the rim 1640, and can be configured by a user to facilitate the opening and closing of the lid 1605.

Figure 17:
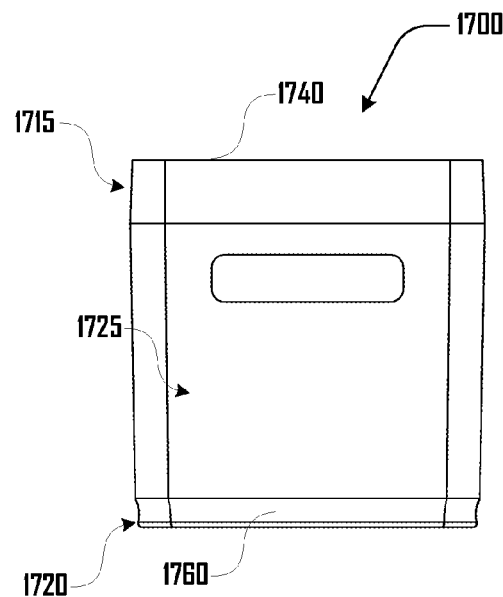
FIG. 17 is a side elevational view of a stackable container in accordance with one embodiment.

In one embodiment, a first stackable container 1600 can be stacked with a second stackable container 1600. For example, the container body flange 1660 of a first stackable container 1600 can correspond to an orifice defined by the rim 1640 of a rim body 1615 such that the container body flange 1660 fits within the orifice. In one embodiment, the first container body flange 1660 can contact the interior surface of the rim 1640 of the second stackable container 1600 and create a friction coupling between the first and second stackable container 1600, 1600. In one embodiment, a plurality of stackable containers 1600 can be coupled together via any method or system described herein or otherwise known in the art. In a further embodiment, stackable containers 1600 can be of any size or shape, and the stackable containers 1600 can be of different size or shape from other stackable containers 1600 within a stack FIG. 17 is a side elevational view of a stackable container 1700, in accordance with another embodiment. The stackable container 1700 comprises a rim body 1715, which comprises a rim 1740; a cover 1725; and a container body 1720, which comprises a container body flange 1760. The rim body 1715 is coupled to a first end of the container body 1720, which is opposite to the container body flange 1760 of the container body 1720. The cover 1725 is coupled to the container body 1720 as described herein.

Figure 18:
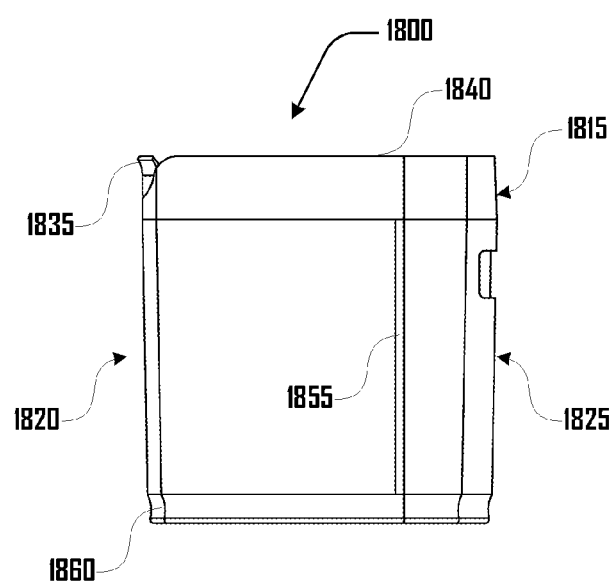
FIG. 18 is another side elevational view of a stackable container in accordance with an embodiment.

FIG. 18 is another side elevational view of a stackable container 1800 in accordance with one embodiment. The stackable container 1800 comprises a rim body 1815, which comprises a rim 1840; a cover 1825; a lid nodule 1835 of a lid; and a container body 1820, which comprises a container body flange 1860 and a cover coupling 1855. The rim body 1815 is coupled to a first end, which is opposite to the container body flange 1860 of the container body 1820. The cover 1825 is coupled to the container body 1820 by the coupling of the cover 1825 to the cover coupling 1855 as described herein.

Figure 20:
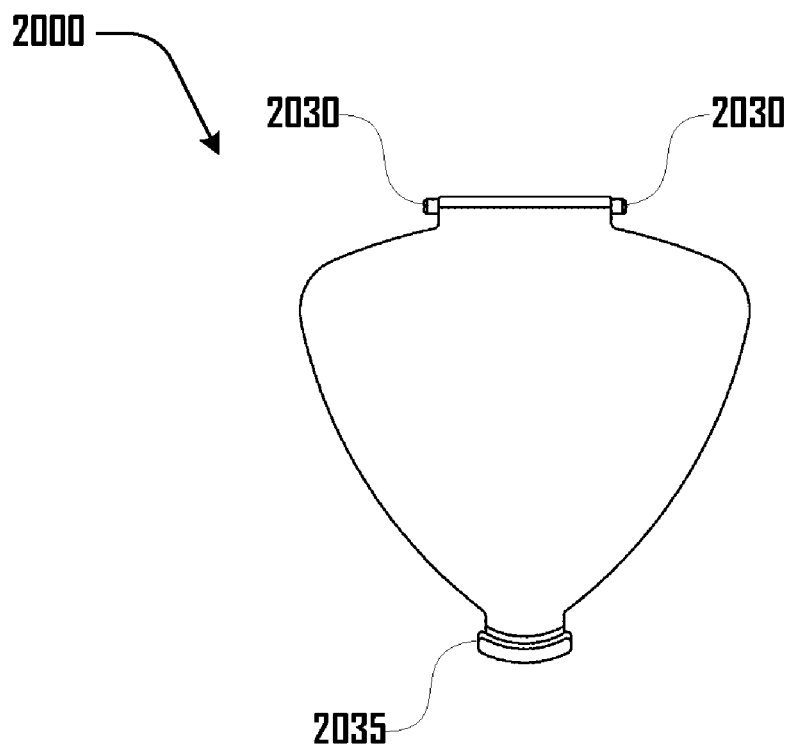
FIG. 20 is a top elevational view of a lid in accordance with one embodiment.

FIG. 19 is a top elevational view of a rim body 1900 in accordance with one embodiment. The rim body 1900 comprises a rim 1940, a rim body coupling member 1945, a rim basin 1970, a rim body coupling member 1945, and a cap coupling rim 1980. In one embodiment, a cap (see, e.g. FIGS. 3 and 15) can be coupled to the rim body 1900 by coupling the cap to the cap coupling rim 1980. In one embodiment, the cap coupling rim 1980 can create a friction fit coupling with the cap and thereby couple the cap to the rim body 1900. FIG. 20 is a top elevational view of a lid 2000 in accordance with one embodiment. The lid as depicted comprises a first and second lid coupling member 2030 and a lid nodule 2035.

Additionally, although specific embodiments have been illustrated and described herein, it will be appreciated by those of ordinary skill in the art and others, that a wide variety of alternate and/or equivalent implementations may be substituted for the specific embodiment shown in the described without departing from the scope of the embodiments described herein. This application is intended to cover any adaptations or variations of the embodiment discussed herein. Therefore, it is manifested and intended that the invention be limited only by the claims and the equivalents thereof. While preferred and alternate embodiments have been illustrated and described, as noted above, many changes can be made without departing from the spirit and scope of the invention. Accordingly, the scope of the invention is not limited by the disclosure of these preferred and alternate embodiments. Instead, the invention should be determined by reference to the claims that follow.

The invention claimed is:

1. A stackable container, the stackable container comprising:
    a container body, the container body comprising:
        a container body flange at a bottom end, and
        a rim body, the rim body comprising a rim that defines an orifice, the rim body being positioned on a top end of the container body, wherein the container body flange corresponds to the orifice defined by the rim;
    a container cap, the container cap being coupled to the rim body; and
    a lid, wherein the lid is coupled to the rim body, and wherein the lid is configured to cover the orifice defined by the rim.

2. The stackable container of claim 1, further comprising the container cap being coupled to the container body within the orifice defined by the rim.

3. The stackable container of claim 2, wherein the container cap is coupled to the container body via a cap coupling rim.

4. The stackable container of claim 2, further comprising a lid, wherein the lid is coupled to the container cap, and wherein the lid is configured to cover the orifice defined by the rim.

5. The stackable container of claim 3, further comprising a lid, wherein the lid is coupled to the container cap, and wherein the lid is configured to cover the orifice defined by a cap coupling rim.

6. The stackable container of claim 5, wherein the lid further comprises a lid nodule, and wherein the rim defines a rim basin, and the lid nodule is configurable to reside within the rim basin when the lid is covering the orifice defined by the cap coupling rim.

7. The stackable container of claim 4, wherein the lid further comprises a lid nodule, and wherein the rim defines a rim basin, and the lid nodule is configurable to reside within the rim basin when the lid is covering the orifice defined by a cap coupling rim.

8. A stackable container, the stackable container comprising:
    a container body, the container body defining an orifice, the container body comprising a container body flange; at a bottom end
    a rim body, the rim body comprising a rim that defines an orifice, the rim body being coupled to the container body about the orifice defined by the container body, wherein the container body flange corresponds to the orifice defined by the rim;
    a container cap, the container cap being coupled to the rim body within the orifice defined by the rim; and
    a lid, wherein the lid is coupled to the rim body, and wherein the lid is configured to cover the orifice defined by the rim.

9. The stackable container of claim 8, wherein the container cap is coupled to the rim body via a cap coupling rim.

10. The stackable container of claim 9, further comprising a lid, wherein the lid is coupled to the rim body, and wherein the lid is configured to cover the orifice defined by a cap coupling rim.

11. The stackable container of claim 8, wherein the lid further comprises a lid nodule, and wherein the rim defines a rim basin, and the lid nodule is configurable to reside within the rim basin when the lid is covering the orifice defined by a cap coupling rim.

* * * * *